Oct. 14, 1958 R. G. GROOM 2,856,464

TAPE TRANSPORT APPARATUS

Filed May 14, 1956

INVENTOR.
ROBERT GEORGE GROOM
BY
Christie, Parker & Hale
ATTORNEYS

United States Patent Office 2,856,464

Patented Oct. 14, 1958

2,856,464

TAPE TRANSPORT APPARATUS

Robert George Groom, La Crescenta, Calif., assignor, by mesne assignments, to Burroughs Corporation, Detroit, Mich., a corporation of Michigan Application May 14, 1956, Serial No. 584,590

7 Claims. (Cl. 179—100.2)

This invention relates to tape transport systems, and more particularly, is concerned with improved apparatus for applying drag to a single tape or a plurality of tapes simultaneously to maintain proper tension of the tapes at all times.

In any apparatus using magnetic tape or other strip materials for recording information, the problem of transporting the tape at high speed past an operational zone, such as a recording or playback head, and to do so in either direction, has been troublesome. Sufficient drag must be applied to the tape to maintain the tape tension across the head as the tape travels in either direction, and to maintain this tension while the tape reverses direction to prevent the tape from snapping and breaking. It has been the general practice to apply drag tension to the tape by breaking the tape reels, where the tape is carried on reels, or by applying a friction drag directly to the surfaces of the tape where no reels are used, as where the tape is stored in bins, for example, and a drag must therefore be imposed directly on the tape. The usual mechanical drag, such as a pair of friction surfaces applied to opposite sides of the tape to clamp the tape, has the disadvantage that it must be closely adjusted to impose the proper drag and therefore generally requires frequent readjustment as the friction surfaces wear. Furthermore, a mechanical drag system of this type, in bearing against the oxide-coated side of the magnetic tape, produces excessive wear, causing the oxide to be worn off the tape at an excessive rate. Where multiple tapes are used, the mechanical drag requires separate adjustment for each tape to obtain uniform drag on all tapes.

The present invention provides improved means for imposing drag on the tapes used in a bidirectional tape transport system. To this end the invention provides a pair of ducts positioned on either side of the operational zone in which the magnetic heads are located. The magnetic heads are located between the respective driving points from which the tapes are driven in one direction or the other. The ducts have surfaces which are in sliding contact with the non-oxide side of the magnetic tape. The tape is clamped against the surface of the ducts by means of openings in the ducts behind the tape across which a pressure differential is maintained, as by providing a partial vacuum within the ducts.

A better understanding of the operation and construction of an illustrative embodiment of the invention, along with the various advantages thereof, may be had with reference to the accompanying drawings, in which.

Figures 1, 2, 3:
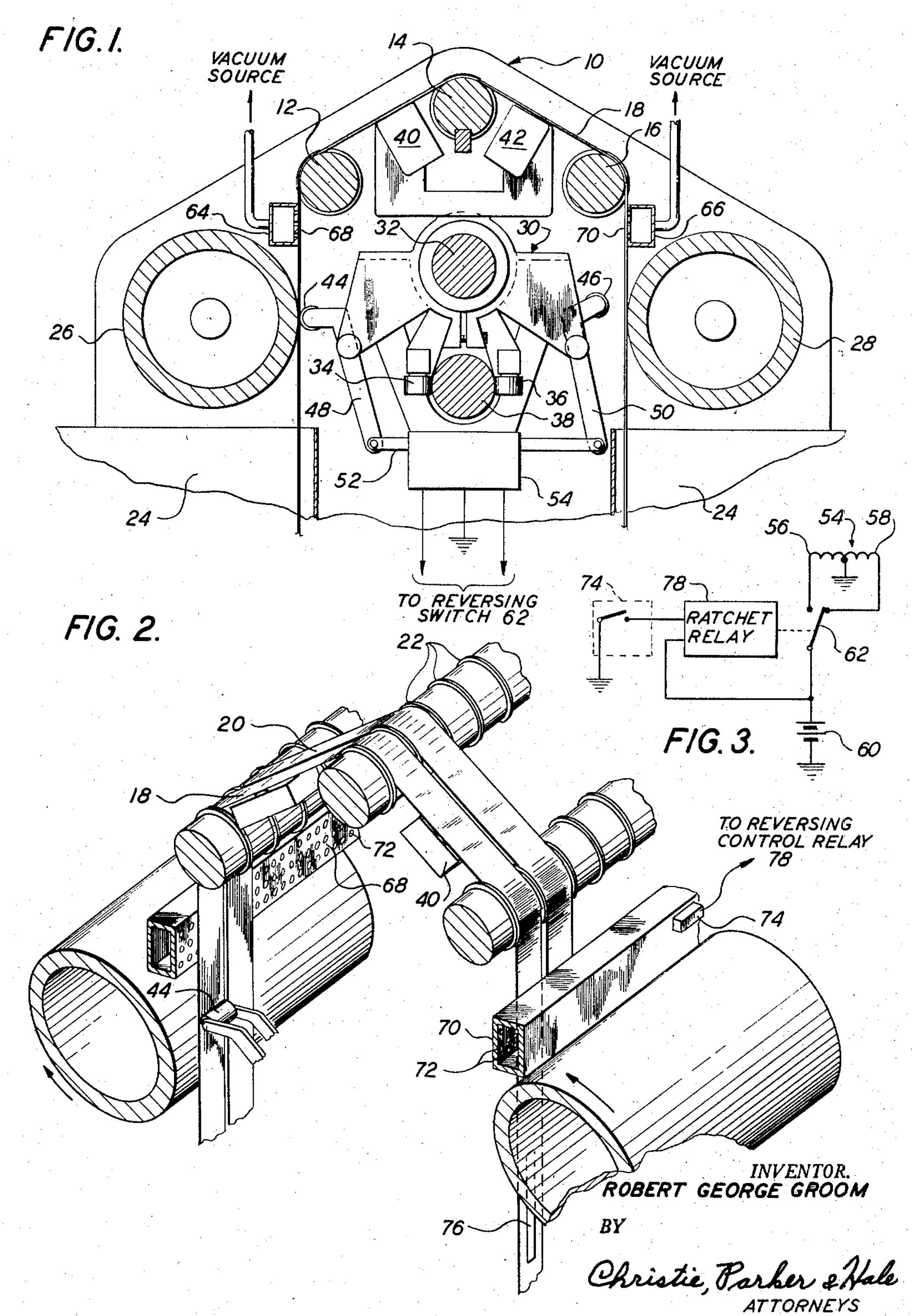
Fig. 1 is a sectional elevation of a tap transport system employing the features of the present invention.
Fig. 2 is a perspective view of the tape transport apparatus of Fig. 1.
Fig. 3 is a schematic diagram of the drive control.

The above figures and the general description which follows are directed to an information storage system of the type particularly described in co-pending application Serial No. 506,875, filed May 9, 1955, in the name of Duncan N. MacDonald. While the invention is particularly well suited to operation in combination with the information storage system and associated tape transport arrangement therein described, it is to be understood that the invention may be useful in combination with other tape transport systems.

In the drawings, the numeral 10 indicates generally the main frame of the tape transport system and includes three tape support rods 12, 14 and 16 across which are positioned a plurality of tape elements or strips, two of which are indicated at 18 and 20. Each of the tape support rods is provided with rings, as indicated at 22, for separating the respective tape strips.

Located below the tape support rods 12, 14 and 16 are a plurality of tape storage bins, indicated generally at 24, there being a storage bin for each end of each tape strip. The tape bins are arranged to receive the tape in individual tape compartments. A description of one suitable construction for the tape bins may be found in the co-pending application Serial No. 463,891, filed October 22, 1954, in the name of Duncan N. MacDonald. While only two tape strips have been shown in the perspective view of Fig. 2, it will be understood that the data storage system may be arranged to handle any number of parallel tapes, and additional bins may be provided as required.

In order to drive selected ones of the multiple tapes, a pair of drive rollers 26 and 28 are rotatably supported by the frame 10 in tangential contact with the tape just below the support rods 12 and 16, respectively. The drive rolls 26 and 28 are rotated by suitable motor-driven drive means (not shown) so as to rotate in opposite directions from each other at the desired speed. Positioned below the tape support rods and between the drive rolls 26 and 28 is a carriage frame, indicated generally at 30, which is slidably supported by a carriage support rod 32 secured to the main frame 10. Guide rollers 34 and 36 which engage a carriage guide rod 38 extending the length of the machine below the carriage support rods 32, are rotatably secured to the lower portion of the carriage frame 30.

The frame of the carriage 30 supports a pair of transducers 40 and 42 positioned adjacent the lower, magnetizable surface of the tape strip in the spaces between the support rods 12 and 14, and 14 and 16. Thus, by slidably positioning the carriage 30 along the carriage support rod 32, the transducers 40 and 42 may be selectively positioned opposite any one of the multitude of tape strips.

In order to drive the selected tape past the transducers 40 and 42, a pair of pinch rollers 44 and 46 are arranged to hold the tape against one or the other of the tape drivers 26 and 28. The pinch rollers 44 and 46 are respectively supported by arms 48 and 50 which are pivotally secured to the carriage frame 30. The lower ends of the arms 48 and 50 are linked together by a rod 52 which forms the plunger of a solenoid 54 carried by the carriage frame 30. The solenoid 54 is provided with a pair of coils 56 and 58, as shown in Fig. 3, which may be selectively energized from a power source 60 by means of double-throw switch 62 to engage one or the other of the pinch rollers with the tape.

In order to maintain proper drag on the tape as it is drawn across the transducers 40 and 42 in either direction, as determined by which of the pinch rollers 44 and 46 are engaged with the tape, a pair of rectangular ducts 64 and 66 are fixedly positioned adjacent the outer surface of the tapes. The ducts are located respectively between the driver 26 and support rod 12, and the driver 28 and the support rod 16.

The ducts 64 and 66 have broad surfaces 68 and 70 thereof in the plane of the tapes. These surfaces are provided with a plurality of openings 72 which are normally covered by the tapes. The ducts 64 and 66 are closed at each end and connected to a suitable vacuum source (not shown) to maintain reduced pressure within the ducts. By this arrangement each of the tapes is held tightly against the broad surfaces 68 and 70 of the ducts 64 and 66 by the pressure differential which exists across the holes 72. A large number of small holes is preferable in the area of contact between the tape and the ducts so that the maximum surface of the tapes is exposed to the pressure differential and yet the tape is adequately supported to prevent distortion and possible tearing of the tape as it passes over the ducts at high speed.

The vacuum-operated drag may be utilized to sense the end of the tape and to reverse the direction of drive of the tape. This is accomplished by means of a pressure-sensitive switch, indicated at 74 in Fig. 2, connected to each of the ducts. A suitable switch is described in co-pending application Serial No. 483,135 filed January 20, 1955, now Patent No. 2,815,907, dated March 22, 1957 in the name of Frederick S. McCormick. By providing the ends of the tapes with an elongated opening 76, a pressure increase with a duct is effected when the end of the tape reaches the duct. The pressure-sensitive switch 74 is actuated by the sudden increase of pressure within the duct, the switch actuating a ratchet-type relay 78. The relay 78 operates to reverse the switch 62 each time the relay is energized so as to reverse the direction of drive of the tape.

It will be seen from the above description that the ducts provide equal drag on all the tapes simultaneously regardless of which tape is being driven at any given time. Merely by adjusting the degree of vacuum within the ducts, the drag provided may be adjusted equally and simultaneously on all the tapes by a single control. Moreover, since the ducts are only in contact with the outer surface of the tapes, which is the oxide-free side of the tapes, there is no wear of the oxide coating introduced by the drag means. The vacuum ducts provide continuous even drag in either direction of movement of the tapes.

I claim:

1. A tape transport apparatus for a multiple tape data storage system, said apparatus comprising a plurality of tapes, each tape having openings therethrough adjacent the respective ends, means for supporting the tapes in parallel relationship with a portion of the broad surfaces of the tapes lying in substantially a common plane, means including a transducer movable transversely of the tapes for detecting and recording information on a selected one of the tapes, bidirectional drive means movable with the transducer means for driving the selected tape in either direction past the transducer means, a pair of hollow ducts having their longitudinal axes extending transversely of the tapes and extending beyond the tapes at either end, the ducts being positioned respectively on each side of the transducer means between the transducer means and the drive means, each of the ducts having a flat broad surface in the plane of the tapes, the ducts having a plurality of openings opposite each of the tapes, whereby the openings are normally closed off by the tapes, means for maintaining a partial vacuum in the ducts, and means responsive to a pressure increase in the ducts for reversing the direction of drive of the selected tape when one of the openings in the ends thereof comes in registry with openings in the ducts.

2. A tape transport apparatus for a multiple tape data storage system, said apparatus comprising means for supporting the tapes in parallel relationship, means including a transducer movable transversely of the tapes for detecting and recording information on a selected one of the tapes, bidirectional drive means movable with the transducer means for driving the selected tape in either direction past the transducer means, a pair of hollow ducts having their longitudinal axes extending transversely of the tapes and extending beyond the tapes at either end, the ducts being positioned respectively on each side of the transducer means between the transducer means and the drive means, each of the ducts having a surface in contact with the tapes over a substantial area of the tapes, the ducts having a plurality of openings opposite each of the tapes, whereby the openings are normally closed off by the tapes, means for maintaining a partial vacuum in the ducts, and means responsive to a sudden pressure change in the ducts for reversing the direction of drive of the selected tapes.

3. A tape transport apparatus for a multiple tape data storage system, said apparatus comprising means for supporting the tapes in parallel relationship, means including a transducer for detecting and recording information on the tapes, bidirectional drive means for driving the tapes in either direction past the transducer means, a pair of hollow ducts having their longitudinal axes extending transversely of the tapes and extending beyond the tapes at either end, the ducts being positioned respectively on each side of the transducer means between the transducer means and the drive means, each of the ducts having a surface in contact with the tapes over a substantial area of the tapes, the ducts having a plurality of openings opposite each of the tapes, whereby the openings are normally closed off by the tapes, means for maintaining a partial vacuum in the ducts, and means responsive to a pressure increase in the ducts for reversing the direction of drive of the tapes.

4. A tape transport apparatus for a multiple tape data storage system, said apparatus comprising means for supporting the tapes in parallel relationship with the broad surfaces of the tapes lying in substantially a common plane, means including a transducer for detecting and recording information on the tapes, bidirectional drive means for driving the tapes in either direction past the transducer means, a pair of hollow ducts having their longitudinal axes extending transversely of the tapes and extending beyond the tapes at either end, the ducts being positioned respectively on each side of the transducer means between the transducer means and the drive means, each of the ducts having a surface in contact with the broad surfaces of the tapes, the ducts having a plurality of openings opposite each of the tapes, whereby the openings are normally closed off by the tapes, and means for maintaining a partial vacuum in the ducts.

5. A tape transport apparatus for a multiple tape data storage system, said apparatus comprising means for supporting the tapes in parallel relationship with the broad surfaces of the tapes lying in substantially a common plane, means including a transducer for detecting and recording information on the tapes, means for driving the tapes past the transducer means, a duct having its longitudinal axis extending transversely of the tapes and extending beyond the tapes at either end, the duct being positioned on the side of the transducer remote from the point of driving the tapes, the duct having a broad surface in contact with the broad surfaces of the tapes and having a plurality of openings opposite each of the tapes, whereby the openings are normally closed off by the tapes, and means for maintaining a partial vacuum in the duct.

6. Bidirectional tape transport apparatus for driving a flexible tape past an operational zone, said apparatus comprising first drive means for pulling the tape in one direction past the operational zone, second drive means for pulling the tape in the opposite direction past the operational zone, reversing means for selectively engaging the first or second drive means with the tape, first and second ducts having surfaces in sliding engagement with the tape, the ducts being positioned respectively between the operational zone and the first and second drive means, each of the ducts having a plurality of openings in the surface area in contact with the tape, the openings normally being closed off by the tape, means for maintaining a partial vacuum in the ducts, whereby the tape is held against the duct surfaces by the pressure differential on opposite sides of the tape at the openings, and means responsive to a sudden pressure increase in the ducts for actuating the reversing means when a pressure increase occurs.

7. Apparatus as defined in claim 5 wherein the duct is positioned adjacent the opposite surface of the tape from the surface adjacent the transducer.

References Cited in the file of this patent

UNITED STATES PATENTS

| | | |
|---|---|---|
| 2,069,595 | Thomas | Feb. 2, 1937 |
| 2,778,634 | Gams et al. | Jan. 22, 1957 |